United States Patent
Scales, III et al.

(10) Patent No.: US 6,202,130 B1
(45) Date of Patent: Mar. 13, 2001

(54) DATA PROCESSING SYSTEM FOR PROCESSING VECTOR DATA AND METHOD THEREFOR

(75) Inventors: Hunter Ledbetter Scales, III, Austin, TX (US); Keith Everett Diefendorff, Los Gatos, CA (US); Brett Olsson, Cary, NC (US); Pradeep Kumar Dubey, White Plains, NY (US); Ronald Ray Hochsprung, Los Gatos, CA (US); Bradford Byron Beavers, Austin, TX (US); Bradley G. Burgess, Austin, TX (US); Michael Dean Snyder, Austin, TX (US); Cathy May, Millwood, NY (US); Edward John Silha, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/061,975

(22) Filed: Apr. 17, 1998

(51) Int. Cl.$^7$ ............................. G06F 12/00; G06F 13/00
(52) U.S. Cl. ................................. 711/137; 712/6
(58) Field of Search ................. 711/137; 712/6

(56) References Cited

U.S. PATENT DOCUMENTS

| | | | |
|---|---|---|---|
| 4,744,043 | 5/1988 | Kloker | 364/736 |
| 4,888,679 | * 12/1989 | Fossum et al. | 364/200 |
| 5,375,216 | 12/1994 | Moyer et al. | 395/421 |
| 5,694,565 | 12/1997 | Kahle et al. | 395/392 |
| 5,946,496 | * 8/1999 | Sugumar et al. | 395/800.02 |

OTHER PUBLICATIONS

Hewlett Packard, "64–bit and Multimedia Extensions in the PA–RISC 2.0 Architecture", Computing Directory Technologies Precision Architecture Document, "MIPS Digital Media Extension", Rev. 1.0 C–1 through C40 (1997).

Motorola, Inc., "MC88110 Second Generation RISC Microprocessor User's Manual", pp. 9–29 through 9–30 (1991).

* cited by examiner

*Primary Examiner*—John W. Cabeca
*Assistant Examiner*—Pierre M. Vital
(74) *Attorney, Agent, or Firm*—Paul J. Polansky

(57) ABSTRACT

A data processing system includes a data processor (10) coupled to a memory system having a first memory, such as an L1 data cache (16), arranged with a second memory (such as an L2 cache) at a lower hierarchical level. The data processor (10) prefetches data elements of a vector into the first memory prior to processing such data elements. If a requested data element is not present in the first memory, a load request is issued to the second memory and to lower levels of the memory hierarchy until the requested data element is finally retrieved and stored in the first memory. The data processor (10) continues to prefetch subsequent data elements of the vector by considering the length of the data element and the stride of the vector. In one embodiment, the data processor (10) prefetches the vector into the first memory in response to a single data stream touch load (DST) instruction (100).

29 Claims, 2 Drawing Sheets

DATA PROCESSING SYSTEM FOR PROCESSING VECTOR DATA AND METHOD THEREFOR

FIELD OF THE INVENTION

This invention relates generally to data processing systems, and more particularly to data processing systems which process vector data.

BACKGROUND OF THE INVENTION

A known way to increase the performance of a computer system is to include a local, high speed memory known as a cache. A cache increases system performance because there is a high probability that once the central processing unit (CPU) has accessed a data element at a particular address, its next access will be to an adjacent address. The cache fetches and stores data which is located adjacent to the requested piece of data from a slower, main memory or lower-level cache. In very high performance computer systems, several caches may be placed in a hierarchy. The cache which is closest to the CPU, known as the upper-level or "L1" cache, is the highest level cache in the hierarchy and is generally the fastest. Other, generally slower caches are then placed in descending order in the hierarchy starting with the "L2" cache, etc., until the lowest level cache which is connected to main memory. Note that typically the L1 cache is located on the same integrated circuit as the CPU and the L2 cache is located off-chip. However as time passes it is reasonable to expect that lower-level caches will eventually be combined with the CPU on the same chip.

Recently, microprocessors designed for desktop applications such as personal computers (PCs) have been modified to increase processing efficiency for multimedia applications. For example, a video program may be stored in a compression format known as the Motion Picture Experts Group MPEG-2 format. When processing the MPEG-2 data, the microprocessor must create frames of decompressed data quickly enough for display on the PC screen in real time. The video frame can be represented as a two-dimensional vector, wherein each pixel location corresponds to a unique row and column of the vector. In order to display the data in real time, the microprocessor must process this two-dimensional vector quickly. However conventional microprocessors for desktop applications only contain integer and floating-point scalar processing capability. What is needed then is a data processor for desktop applications which can process vector data quickly as well. This need is met by the present invention, whose features and advantages will be more clearly understood from the following detailed description taken in conjunction with the accompanying drawings.

SUMMARY OF THE INVENTION

In a data processing system, an instruction for prefetching a vector into a first memory from a second memory which is at a lower hierarchical level than the first memory. In general, the vector comprises n units distributed in the second memory such that each unit is located at an effective address $$ea=(ba+(s*i))$$

where:
    ba is the base address of the first unit of the vector;
    s is the stride between units of the vector; and
    i is an index having a value from 0 to (n−1).

In response to the instruction, a count c is first initialized, then the ea of a cth unit of the vector is calculated. Using this ea, the cth unit of the vector is prefetched from the second memory into the first memory. The count c is then stepped, and, if the count c is a predetermined value with respect to n, the prefetch is repeated for the next unit of the vector. The instruction allows prefetching of the vector in either normal or reversed order, and along a diagonal of a multi-dimensional array.

An object of the present invention is to provide an instruction that explicitly allows all units of a vector to be prefetched into a non-architected memory, such as a level-1 cache, from a lower level memory structure, such as a lower-level cache or main memory.

Another object of the present invention is to provide a vector prefetch instruction that can be halted in response to a change to a different operating mode, and later restarted.

Yet another object of the present invention is to provide a vector prefetch instruction that can be halted in response to a vector prefetch stop instruction.

One other object of the present invention is to provide a method of operation of such a vector prefetch instruction.

DETAILED DESCRIPTION OF A PREFERRED EMBODIMENT

Figure 1:
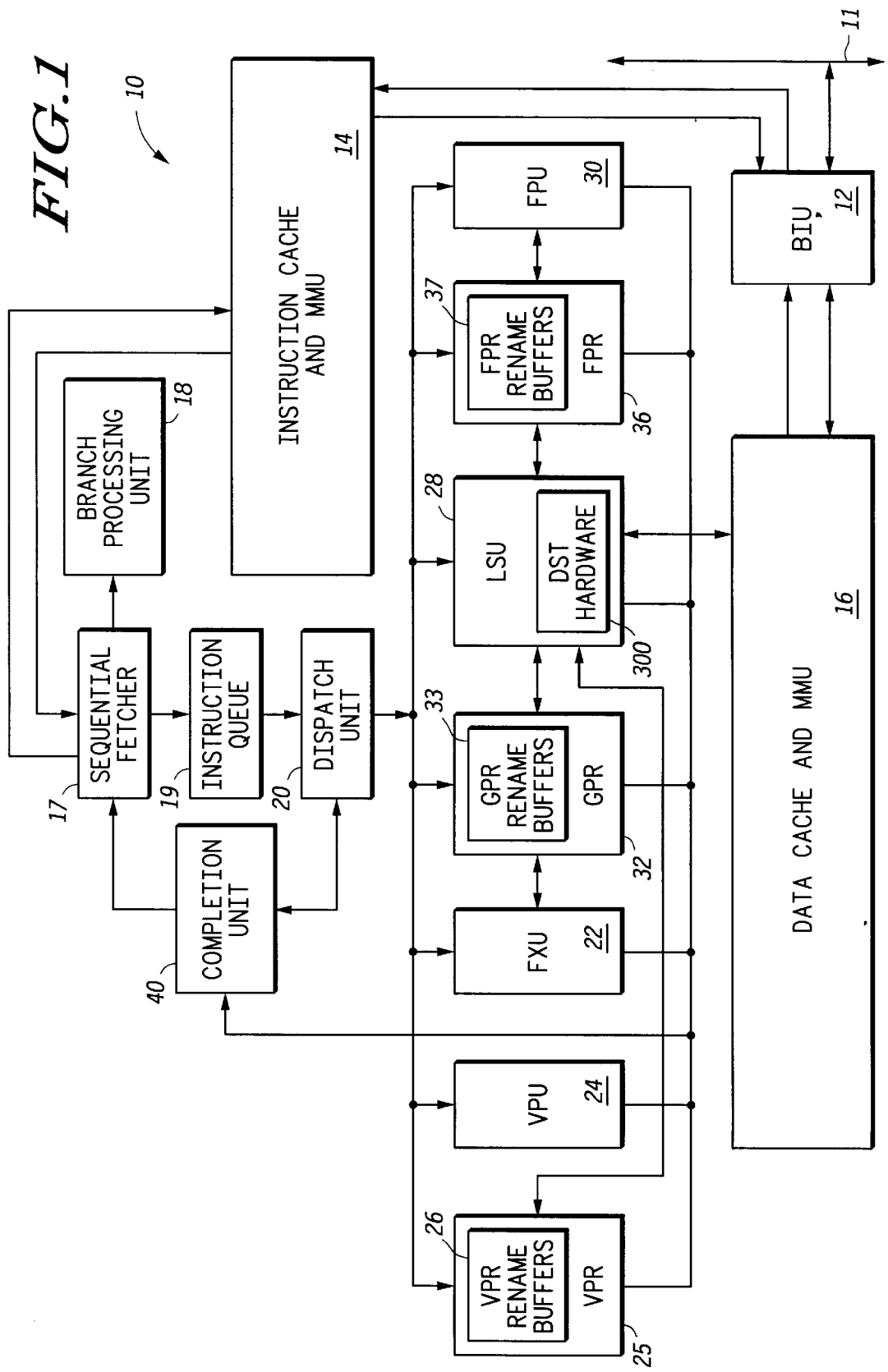
FIG. 1 illustrates in block diagram form a data processor according to the present invention.

With reference now to the figures, and in particular with reference to FIG. 1, there is illustrated a block diagram of a data processor, indicated generally as 10, for processing information according to a preferred embodiment of the present invention. In the depicted embodiment, data processor 10 comprises a single integrated circuit superscalar microprocessor capable of executing multiple instructions per processor cycle. Accordingly, as discussed further below, data processor 10 includes various execution units, registers, buffers, memories, and other functional units, which are all formed by integrated circuitry. In a preferred embodiment of the present invention, data processor 10 comprises one of the PowerPC™ line of microprocessors produced by Motorola, Inc., which operates according to reduced instruction set computing (RISC) techniques.

As depicted in FIG. 1, data processor 10 forms a central processing unit (CPU) of a data processing system and is coupled to system bus 11 via a bus interface unit (BIU) 12 within data processor 10. BIU 12 controls the transfer of information between data processor 10 and other devices coupled to system bus 11, such as a main memory (not illustrated). Data processor 10, system bus 11, and the other devices coupled to system bus 11 together form a host data processing system. BIU 12 is connected to instruction cache 14 and data cache 16 within data processor 10. High speed caches, such as instruction cache 14 and data cache 16, enable data processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within data processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units, the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order. Completion unit 40 tracks instructions from dispatch through execution, and then retires, or "completes" them in program order. Completing an instruction commits the process to any architectural register changes caused by that instruction. In order completion ensures the correct architectural state when the microprocessor must recover from a mispredicted branch or any exception.

In the depicted embodiment, in addition to BPU 18, the execution circuitry of data processor 10 comprises multiple execution units, including fixed-point unit (FXU) 22, vector processing unit (VPU) 24, load/store unit (LSU) 28, and floating-point unit (FPU) 30. These execution units can execute instructions simultaneously during a single processor cycle. Each of execution units 18, 22, 24, 28, and 30 can execute one or more instructions within a particular class of instructions. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. VPU 24 performs vector-oriented operations using operands received from vector processing registers (VPRs) 25 or VPR rename buffers 26. VPU 24 outputs data resulting from the execution of vector instructions to selected VPR rename buffers 26, which temporarily store the result data until the instructions are completed by transferring the result data from VPR rename buffers 26 to selected VPRs 25. FPU 30 performs floating-point operations, such as floating-point multiplication and division, on source operands received from floating-point registers (FPRs) 36, FPR rename buffers 37, VPRs 25, or VPR rename buffers 26. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32, FPRs 36, VPRs 25, or that store data from a selected one of GPRs 32, GPR rename buffers 33, FPRs 36, FPR rename buffers 37, VPRs 25, or VPR rename buffers 26 to memory. In accordance with the present invention, LSU 28 also includes data stream touch load (DST) hardware 300 which will be described more fully below.

Data processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, data processor 10 dispatches instructions in program order and tracks the program order of the dispatched instructions during out-of-order execution utilizing unique instruction identifiers. In addition to an instruction identifier, each instruction within the execution pipeline of data processor 10 has an rA tag and a rB tag and/or a rC tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

Figure 2:
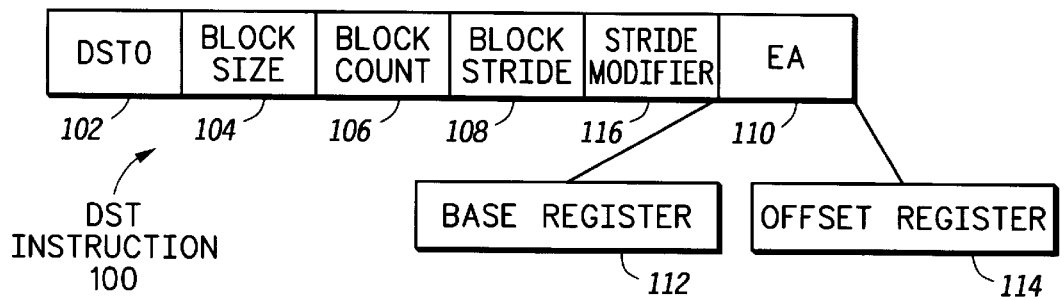
FIG. 2 illustrates in block diagram form an encoding of the data stream touch load instruction used by the data processor of FIG. 1.

With reference now to FIG. 2, there is shown a graphical representation of the fields of a data stream touch load instruction, in accordance with the preferred embodiment of the present invention. The data stream touch load (DST) instruction prefetches a stream of bytes from lower levels of the memory hierarchy and loads them into the non-architected, higher, faster levels of memory prior to issuance of a load instruction requesting that data stream. As used herein, "non-architected" means not present in the programmer's model. For example, the DST instruction could preload a frame of video data from the system memory into the data cache prior to a load instruction requesting that frame and while the processor is processing a previous frame. Thus, it can be seen that the DST instruction is designed to allow preloading of vector data from a lower level of memory into a higher level while processor execution is allowed to continue, improving processor speed and efficiency.

As illustrated in FIG. 2, DST instruction 100 includes a plurality of fields, including an op code 102 labeled "DST0", a BLOCK SIZE 104, a BLOCK COUNT 106, a BLOCK STRIDE 108, a STRIDE MODIFIER 116, and an effective address field (EA) 110. In an alternative embodiment of the present invention, a general-purpose register holds the field data for the BLOCK SIZE, BLOCK COUNT, and BLOCK STRIDE and the DST instruction points to that register. Op code 102 indicates that the instruction is a DST instruction prefetching a data stream or vector from memory. As defined herein, a vector is "prefetched" when it is brought from a lower level of the memory hierarchy into a higher level of the memory hierarchy. BLOCK SIZE 104 indicates the number of vector bytes to be retrieved per block for each memory block of the data stream being retrieved from memory. In the preferred embodiment, a vector byte is a 16-bit value. In general, the block size is of arbitrary length and LSU 28 will initiate multiple fetches if the block size exceeds the line size of data cache 16. BLOCK COUNT 106 indicates how many blocks, each of a size equal to BLOCK SIZE 104, will make up the data stream prefetched by this instruction. BLOCK STRIDE 108 indicates the address offset between each block of the data stream. STRIDE MODIFIER 116 indicates a value by which the block stride can be algebraically modified for each block of the block count for this instruction. In a preferred embodiment, BLOCK SIZE 104 is a five-bit field, allowing from 1 to 32 blocks of vector bytes, BLOCK COUNT 106 is an eight-bit field allowing 1 to 256 blocks to be fetched, and BLOCK STRIDE 108 is a signed 16-bit field allowing ±32,768 bytes of stride.

EA 110 designates two registers, a base register 112 and an offset register 114. The values in these two registers are added together to provide the effective address of the first element of the vector being prefetched from memory. In an alternative embodiment, DST instruction 100 contains register fields replacing fields 104, 106, and 108 that designate registers containing the block size, block count, and block stride control information. This alternative embodiment allows the definition of the data stream prefetch to be calculated dynamically during processor execution by accessing this control information.

As one example of the use of the DST instruction, a 2-dimensional data vector in memory may have some number of rows, each row having a single-dimension vector and residing in sequential memory locations. If the data vector being retrieved from memory is contained in sequential locations in the memory (assuming each element in the vector has an element number index), the vector which is formed by the elements in each row which have the same row index is called a column vector. Thus, for example, to fetch the elements of the column vector, the first element would be prefetched from the effective address indicated by EA 110. Then the block stride would be repetitively added to the previous effective address to form the address of each subsequent element of the column vector. The rows of a vector are prefetched by setting the stride equal to one. The columns of a vector are prefetched by setting the stride equal to the length of the row; for DST instruction 100, BLOCK STRIDE 108 would be made equal to the value of BLOCK SIZE 104 because the block stride would be equal to the length of each row of the two-dimensional vector.

Moreover, it will be appreciated by those skilled in the art that the DST instruction can be used to fetch elements of one, two, or higher-dimension vectors. Since a three-dimensional vector may be defined as an array of two-dimensional vectors that each may be called a "page", particular pages within the vector may be accessed by setting the stride value equal to the product of the length of the row and the column of each page or some integer multiple thereof. It will be appreciated that, in general, a vector of any order or number of dimensions may be accessed by the index of its highest order element by setting the stride equal to the product of the length of all the lower order elements.

Diagonal vectors within the vector array can be accessed by utilizing an additional field in the DST instruction that modifies the block stride as each block is accessed in memory. As shown in FIG. 2, STRIDE MODIFIER 116 includes a value by which the block stride is incremented, decremented, or multiplied for each block prefetched to memory.

Also in a preferred embodiment of the present invention, prefetching of multiple data streams can be implemented by executing multiple DST instructions. Each data stream is named by encoding the stream name into the DST instruction itself in op code 102, such as DST0 illustrated in FIG. 2. There would be a separate version of a DST instruction for each separate stream. Thus, for example, a vector function of two operands will, in general, need two data streams to be prefetched simultaneously. The DST instruction may encode any number of streams to be prefetched, but the finite resources available to implement the instruction would limit the number of DST instructions to a reasonably small number, such as four. Hardware or software can further be used to multiplex the actual streaming hardware to make it appear that a larger number of streams were available.

Figure 3:
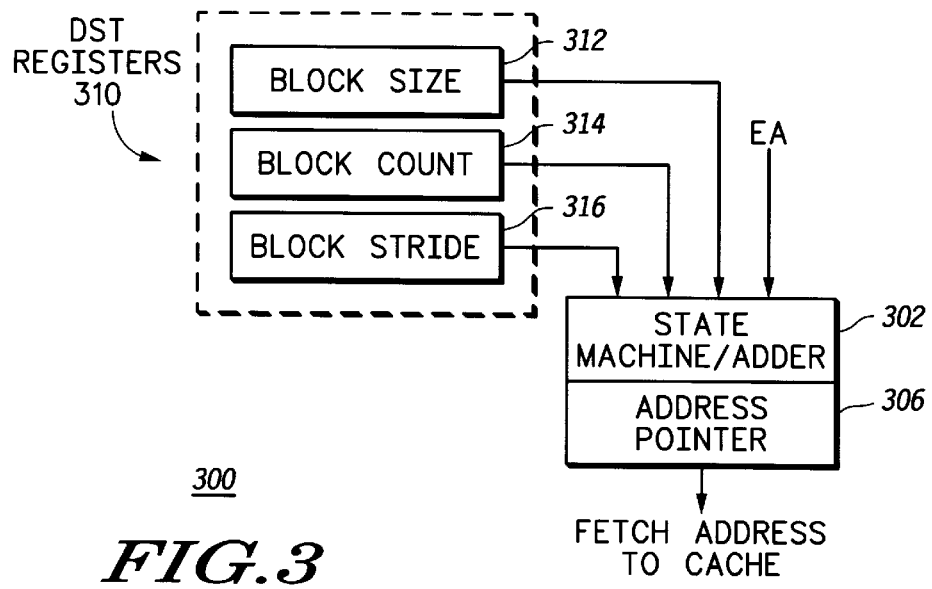
FIG. 3 illustrates in block diagram form one of the data stream touch load circuits of FIG. 1.

With reference to FIG. 3, there is shown DST hardware 300 contained within LSU 28 to assist it in executing a DST instruction in accordance with the preferred embodiment of the present invention. DST registers 310 are loaded with the corresponding block size, block count, and block stride values when the particular DST instruction is executed. For example when used to execute DST instruction 100, BLOCK SIZE 104 is stored in register 312, BLOCK COUNT 106 is stored in register 314, and BLOCK STRIDE 108 is loaded into register 316. State machine/adder 302 receives both the effective address indicated by EA 110 and the contents of DST registers 310. An address pointer register 306 in state machine/adder 302 is initially loaded with the effective address indicated by EA 110. State machine/adder 302 then performs a prefetch of the block addressed at the effective address indicated by EA 110 and having a block size equal to the BLOCK SIZE value in register 312. As will be appreciated, state machine/adder 302 may perform multiple fetches to prefetch the required number of vector bytes equal to the BLOCK SIZE. State machine/adder 302 then adds the BLOCK STRIDE value contained in register 316 to the effective address and stores the sum as the new effective address in address pointer register 306, decrements the BLOCK COUNT contained in register 314, and prefetches the next block from memory by issuing a fetch address to BIU 12 for the next block in the data stream, if the BLOCK COUNT has not been decremented to zero. State machine/adder 302 continues this process of incrementing the effective address by the BLOCK STRIDE, decrementing the BLOCK COUNT, and issuing a fetch address to the cache for the next block of the data stream until the BLOCK COUNT value contained in register 314 has been decremented to zero. At that point, the desired vector has been prefetched into a higher level of the memory hierarchy. As will be appreciated, DST hardware 300 may be duplicated for each data stream prefetch supported by data processor 10, but only DST registers 310 need be duplicated by sharing the remainder of DST hardware 300 between different DST instructions.

The architectural state of the DST instruction is that it is issued, executed, and completed at the same time, even though the DST hardware may continue to implement the DST instruction by proceeding with prefetching the desired data stream into the higher-level memory. Therefore, there may be cases in which it is desirable to stop the prefetch of a particular data stream after the issuance of a DST instruction. In a preferred embodiment, a "DST stop" instruction is provided that, when issued, resets DST hardware 300 to stop a data stream prefetch currently being performed. In addition, certain coding may be structured such that data prefetch of a particular data stream may get ahead of the execution of other code. To keep the executing DST instructions synchronized with the corresponding vector load instructions, a DST instruction is designed, in a preferred embodiment, such that a DST instruction when executed will immediately supersede a previously executed but unfinished DST instruction for the same particular data stream (such as DST0). To step the prefetch back, address pointer register 306 would be modified by subtracting an offset equal to a predetermined number of BLOCK STRIDEs multiplied by the vector BLOCK SIZE (as indicted in register 312), and the BLOCK COUNT in register 314 would also be decremented by the predetermined number.

While the present invention has been described in the context of a data stream prefetch for a load, it will be appreciated that the present invention is also applicable to a prefetch for a data stream store operation. In the illustrated embodiment, data processor 10 also is capable of executing an instruction called a data stream touch for store (DSTST). Data processor 10 executes the DSTST instruction in the same manner as the DST instruction except that it additionally marks the data within the cache as data that will be modified or written by changing its cache state. For example data cache 16 implements the modified, exclusive, shared, invalid (MESI) protocol and data processor 10 marks the prefetched block as data that will be written by placing the cache line or lines corresponding to the prefetched block into the exclusive state in cache 16.

Figure 4:
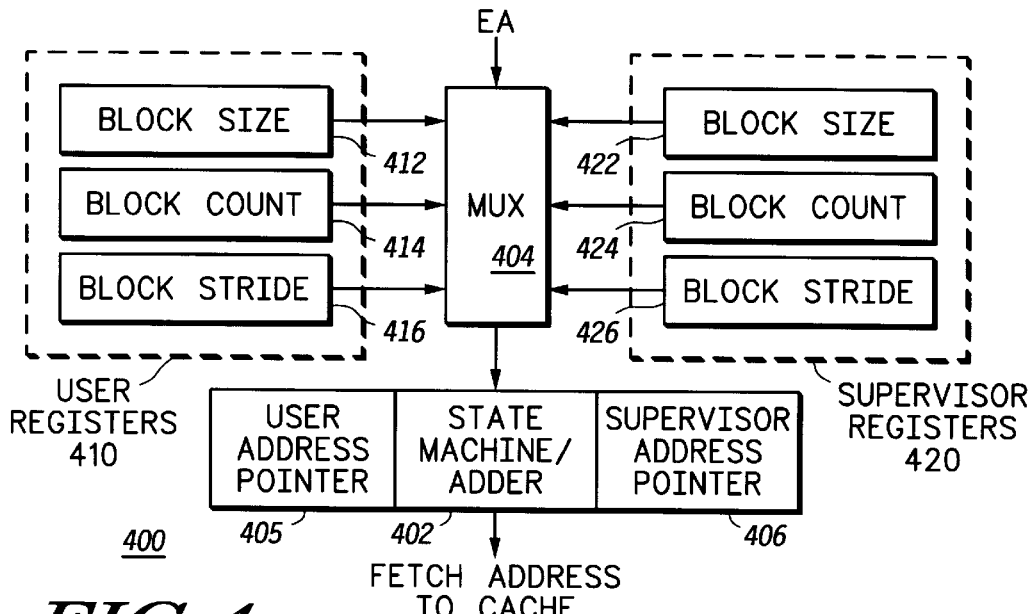
FIG. 4 illustrates in block diagram form an alternate embodiment of one of the data stream touch load circuits of FIG. 1.

With reference now to FIG. 4, there is shown DST hardware 400 for implementing a data stream touch instruction (DST) in either a user mode or a supervisor mode, in accordance with a preferred embodiment of the present invention. DST hardware 400 would be substituted for DST hardware 300 in FIG. 1. For use in a multi-tasking operating system or in a data processing system allowing both a user mode and a supervisor mode, DST hardware 400 provides the capability to suspend the DST instruction during its execution. For example, when an interrupt occurs, DST hardware 400 suspends the data stream being prefetched. When data processor 10 returns from to normal processing from the interrupt, data stream prefetching is resumed at the point of interrupt by DST hardware 400.

When operating in the user mode, data processor 10 will execute some number of DST instructions in a plurality of DST hardware 400. While operating in the user mode, DST instructions executed by the DST hardware 400 would load the BLOCK SIZE, BLOCK COUNT, and BLOCK STRIDE in user registers 412, 414, and 416, and multiplexer 404 would be switched to receive the effective address and values from user registers 410 and to output those values to state machine/adder 402 for execution of the DST instruction. State machine/adder 402 would otherwise operate as state machine/adder 302, with the current value of the address pointer being calculated from the BLOCK SIZE, BLOCK COUNT, and BLOCK STRIDE in registers 412, 414, and 416 and stored in the user address pointer register 405. When the processor is switched to the supervisor mode, an issued DST instruction would load the BLOCK SIZE, BLOCK COUNT, and BLOCK STRIDE into registers 422, 424, and 426, respectively, while user registers 410 would remain suspended at the values previously loaded while operating in the user mode. While operating in the supervisor mode, multiplexer 404 would be switched to receive the effective address and values from supervisor registers 420 and to output those values to state machine/adder 402 for execution of the DST instruction. State machine/adder 402 would otherwise operate the same way as state machine/adder 302, with the current value of the address pointer being calculated from the BLOCK SIZE, BLOCK COUNT, and BLOCK STRIDE in registers 422, 424, and 426 and stored in the supervisor address pointer register 406. When the processor returns to the user mode, a prefetch of a data stream that had been interrupted while in the user mode by a switch to the supervisor mode is resumed by using the values saved in registers 412, 414, and 416.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

We claim:

1. In a data processing system having a first memory and a second memory at a lower hierarchical level than the first memory, a data processor for prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the data processor comprising:

a first register for storing n;

a second register for storing s;

a third register for storing ea;

an arithmetic unit having a first input coupled to the second register, a second input coupled to the third register, and an output terminal, for calculating the effective address ea of each unit i of the n units of the vector and for providing a fetch address to the output terminal thereof corresponding to the effective address ea when enabled;

a load unit coupled to the first memory and to the second memory and having an input terminal for receiving the fetch address, for prefetching a data element located at the fetch address from the second memory into the first memory; and a state machine having an input coupled to the first register, for enabling the arithmetic unit in response to the data processor receiving a predetermined instruction, and for enabling the arithmetic unit repetitively until an nth unit of the vector has been prefetched.

2. The data processor of claim 1 wherein the load unit determines if an ith unit is already stored in the first memory, and, if not, prefetches the ith unit of the vector from the second memory into the first memory.

3. The data processor of claim 1 wherein the data processing system operates in a selected one of a first mode and a second mode, and wherein, if, when operating in the first mode, the second mode is selected, an operation of the data processor is suspended until the first mode is next selected.

4. The data processor of claim 3 wherein the state machine, when operating in the first mode, further terminates the operation of the data processor before all of the n units are prefetched into the first memory in response to a second predetermined instruction.

5. The data processor of claim 1 further including means for selectively terminating an operation of the data processor before all of the n units are prefetched into the first memory.

6. The data processor of claim 1 wherein:
   each of the n units has a length l;
   the data processor further comprises a fourth register for storing l; and
   the arithmetic unit further has a third input for receiving the length l, and enables the arithmetic unit a plurality of times corresponding to the length l to provide a corresponding plurality of fetch addresses for each unit i of the n units.

7. The data processor of claim 6 further comprising a register for storing the fetch address.

8. In a data processing system having a plurality of architectural registers adapted for storing a like plurality of vectors, a first, non-architected memory and a second memory at a lower hierarchical level than the first memory, a method for explicitly prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:
   receiving a predetermined instruction, wherein said predetermined instruction does not cause the data processing system to affect the plurality of architectural registers;
   executing said predetermined instruction by performing the steps of:
   initializing a count c;
   calculating the effective address ea of a cth unit of the vector;
   prefetching the cth unit of the vector from the second memory into the first memory;
   stepping the count c; and
   if the count c is a predetermined value with respect to n, returning to the step of calculating.

9. The method of claim 1 wherein the step of prefetching comprises the steps of:
   determining if the cth unit is already stored in the first memory; and
   if not, prefetching the cth unit of the vector from the second memory into the first memory.

10. The method of claim 1 further comprising the step of selectively terminating the method before all of the n units are prefetched into the first memory.

11. The method of claim 1 further comprising the step of:
   receiving a predetermined instruction and performing all previous steps in response to an execution of the predetermined instruction.

12. The method of claim 1 wherein the step of stepping the count is further characterized as:
   stepping the count c and selectively modifying the stride s.

13. In a data processing system having a first memory and a second memory at a lower hierarchical level than the first memory, a method for prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:
   initializing a count c;
   calculating the effective address ea of a cth unit of the vector;
   prefetching the cth unit of the vector from the second memory into the first memory;
   stepping the count c; and
   if the count c is a predetermined value with respect to n, returning to the step of calculating;
   wherein the data processing system operates in a selected one of a first mode and a second mode, and wherein, if, when operating in the first mode, the second mode is selected, the method is suspended until the first mode is next selected.

14. The method of claim 13 further comprising, when operating in the first mode, the step of selectively terminating the method before all of the n units are prefetched into the first memory.

15. The method of claim 13 wherein the step of stepping the count is further characterized as:
   stepping the count c and selectively modifying the stride s.

16. In a data processing system having a first memory and a second memory at a lower hierarchical level than the first memory, a method for prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:
   initializing a count c;
   calculating the effective address ea of a cth unit of the vector;
   prefetching the cth unit of the vector from the second memory into the first memory;
   stepping the count c; and
   if the count c is a predetermined value with respect to n, returning to the step of calculating;
   wherein the step of prefetching comprises the step of changing a cache state of the cth unit of the vector in the first memory.

17. The method of claim 16 further comprising the step of:
   receiving a predetermined instruction and performing all previous steps in response to an execution of the predetermined instruction.

18. The method of claim 16 wherein the step of stepping the count is further characterized as:

stepping the count c and selectively modifying the stride s.

19. In a data processing system having a plurality of architectural registers adapted for storing a like plurality of vectors, a first, non-architected memory and a second memory at a lower hierarchical level than the first memory, a method for explicitly prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:

receiving a predetermined instruction, wherein said predetermined instruction does not cause the data processing system to affect the plurality of architectural registers:

executing said predetermined instruction by performing the steps of:

for each unit i of the n units:

calculating the effective address ea of the ith unit of the vector; and prefetching the ith unit of the vector from the second memory into the first memory.

20. The method of claim 19 wherein the step of prefetching comprises the steps of:

determining if the ith unit is already stored in the first memory; and if not, prefetching the ith unit of the vector from the second memory into the first memory.

21. The method of claim 19 further comprising the step of selectively terminating the method before all of the n units are prefetched into the first memory.

22. The method of claim 9 further comprising the step of:

receiving a predetermined instruction and performing all previous steps in response to an execution of the predetermined instruction.

23. The method of claim 19 further comprising, after the step of prefetching, the step of:

selectively modifying the stride s.

24. In a data processing system having a first memory and a second memory at a lower hierarchical level than the first memory, a method for prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:

for each unit i of the n units:

calculating the effective address ea of the ith unit of the vector; and prefetching the ith unit of the vector from the second memory into the first memory;

wherein the data processing system operates in a selected one of a first mode and a second mode, and wherein, if, when operating in the first mode, the second mode is selected, the method is suspended until the first mode is next selected.

25. The method of claim 24 further comprising, when operating in the first mode, the step of selectively terminating the method before all of the n units are prefetched into the first memory.

26. The method of claim 24 further comprising, after the step of prefetching, the step of:

selectively modifying the stride s.

27. In a data processing system having a first memory and a second memory at a lower hierarchical level than the first memory, a method for prefetching into the first memory a vector stored in the second memory, the vector comprising n units distributed in the second memory at a stride s relative to a base address ba with an ith unit of the vector stored in the second memory at an effective address ea, where ea=(ba+(s*i)), and i is an index having a value from 0 to (n−1), the method comprising the steps of:

for each unit i of the n units:

calculating the effective address ea of the ith unit of the vector; and prefetching the ith unit of the vector from the second memory into the first memory;

wherein the step of prefetching comprises the step of changing a cache state of the ith unit of the vector in the first memory.

28. The method of claim 27 further comprising the step of:

receiving a predetermined instruction and performing all previous steps in response to an execution of the predetermined instruction.

29. The method of claim 27 further comprising, after the step of prefetching, the step of:

selectively modifying the stride s.

* * * * *